(12) United States Patent
Kümpel et al.

(10) Patent No.: US 10,940,662 B2
(45) Date of Patent: Mar. 9, 2021

(54) PRODUCT FOR STORING MATERIALS SUCH AS TOBACCO MATERIALS OR TOBACCO SUBSTITUTE MATERIALS HAVING ELECTRONIC DEVICE

(71) Applicant: JT International S.A., Geneva (CH)

(72) Inventors: Jürgen Kümpel, Konz (DE); Olaf Janson, Steinhagen (DE)

(73) Assignee: JT International S.A.

(*) Notice: Subject to any disclaimer, the term of this patent is extended or adjusted under 35 U.S.C. 154(b) by 296 days.

(21) Appl. No.: 16/075,058

(22) PCT Filed: Feb. 24, 2017

(86) PCT No.: PCT/EP2017/054387
§ 371 (c)(1),
(2) Date: Aug. 2, 2018

(87) PCT Pub. No.: WO2017/148828
PCT Pub. Date: Sep. 8, 2017

(65) Prior Publication Data
US 2019/0037918 A1    Feb. 7, 2019

(30) Foreign Application Priority Data
Mar. 2, 2016    (WO) ................ PCT/EP2016/054466

(51) Int. Cl.
*B32B 1/02*    (2006.01)
*A24F 15/18*    (2006.01)
(Continued)

(52) U.S. Cl.
CPC .................. *B32B 1/02* (2013.01); *A24B 9/00* (2013.01); *A24F 15/08* (2013.01); *A24F 15/18* (2013.01); *A24F 23/04* (2013.01)

(58) Field of Classification Search
CPC .......... A24F 15/00; A24F 15/01; A24F 15/02; A24F 15/08; A24F 15/12; A24F 15/18;
(Continued)

(56) References Cited

U.S. PATENT DOCUMENTS 4,615,681 A    10/1986    Schwarz
2013/0336358 A1    12/2013    Liu
(Continued)

OTHER PUBLICATIONS

International Search Report for PCT/EP2016/054466 dated Oct. 27, 2016.
(Continued)

*Primary Examiner* — Walter Aughenbaugh
(74) *Attorney, Agent, or Firm* — Lerner, David, Littenberg, Krumholz & Mentlik, LLP

(57) ABSTRACT

A product for holding a tobacco material or a tobacco substitute material includes a body defining a storage environment and an electronic device. The electronic device includes an input means to generate an input signal from an external stimulus; an output means to generate an output signal in response to the input signal; wherein at least the output means is arranged on a substrate; and wherein a protective layer is arranged to at least cover the substrate and the output means so as to prevent egression of compounds therefrom to the tobacco material or tobacco substitute material within the storage environment. The electronic device includes an appropriately adapted protective layer. A user may therefore assess the freshness and quality of a tobacco material within the product, without any risk or altering the properties of the tobacco material via egression from the electronic device to the storage environment.

25 Claims, 5 Drawing Sheets

(51) Int. Cl.
  *A24F 23/02* (2006.01)
  *A24F 15/08* (2006.01)
  *A24B 9/00* (2006.01)
  *A24F 23/04* (2006.01)

(58) Field of Classification Search
  CPC .......... A24F 23/00; A24F 23/02; A24F 23/04;
  B24B 9/00; B32B 1/02
  See application file for complete search history.

(56) References Cited

U.S. PATENT DOCUMENTS

| | | |
|---|---|---|
| 2014/0107815 A1 | 4/2014 | LaMothe |
| 2014/0291179 A1 | 10/2014 | Xiang |
| 2015/0016048 A1 | 1/2015 | Chang et al. |
| 2015/0077981 A1 | 3/2015 | Cormack |
| 2015/0082859 A1 | 3/2015 | Xiang |
| 2017/0038325 A1 | 2/2017 | Takashima et al. |
| 2017/0197777 A1 | 7/2017 | Slooff |

OTHER PUBLICATIONS

International Search Report including Written Opinion for PCT/EP2017/054387 dated May 17, 2017.

PRODUCT FOR STORING MATERIALS SUCH AS TOBACCO MATERIALS OR TOBACCO SUBSTITUTE MATERIALS HAVING ELECTRONIC DEVICE

CROSS-REFERENCE TO RELATED APPLICATIONS

The present application is a national phase entry under 35 U.S.C. § 371 of International Application No. PCT/EP2017/054387, filed Feb. 24, 2017, published in English, which claims priority to International Application No. PCT/EP2016/054466 filed Mar. 2, 2016, the disclosures of which are incorporated herein by reference.

FIELD OF THE INVENTION

The present invention relates to a product for storing materials such as tobacco materials or tobacco substitute materials having an electronic device.

BACKGROUND OF THE INVENTION

Products for storing materials such as tobacco materials or tobacco substitute materials are well known in the art. Such packages may take many different forms, but typically involve the bending or folding, or both, of flexible materials, such as cardboard or plastic, to form the package from one or more sheets of material. It is also known to incorporate electronic devices, typically formed by connecting pre-manufactured discrete components such as a battery, CPU, memory, sensor and display together in a circuit, into such packages. Such packages may be referred to as hybrid packages (or containers).

One example of the use of electronic devices in hybrid packaging is to embed a sensor which can sense one or more parameters relating to a package's storage environment. Another example of a hybrid package is a facial tissue container which has an internal light source which incorporates a printed circuit board connected to multiple LEDs, a switch and a power supply which can emit light under various conditions. A further example of a hybrid package is a package for a CD which comprises organic light emitting devices (OLEDs) and a battery to provide an alphanumeric display on the package which may be used to convey information.

However, one of the problems associated with known hybrid packages is the possibility of a substance derived from the electronic device egressing into the stored product. For example a compound originating in the circuitry, power supply, substrate or any other part of the electronic device may leak, diffuse, detach or in any other way egress so as to come into contact with or influence the product held within the storage environment. Such a process may have an undesired effect on the properties of a product stored within the package, which may be particularly important if the packaging is to be used for food, tobacco, pharmaceutical, or other similar products. As regards tobacco, an undesired effect on it is alteration of TNCO levels (tar, nicotine and CO levels), affecting taste and smell, or even visual appearance of the stored product.

One method to prevent such egression of compounds derived from the electronic device into the storage environment is the introduction of a protective layer arranged to substantially cover the electronic device, sealing it from the storage environment. However where the electronic device is a sensor which requires the reception of an external stimulus, such a protective layer has the potential to block any such external stimulus, preventing it from reaching the electronic device with sufficient intensity to allow the electronic device to function effectively.

It is therefore desirable to provide a product for holding a material wherein the product incorporates an electronic device, which includes means to substantially block the egression of a substance derived from the electronic device into the storage environment whilst permitting the reception of an external signal by the electronic device and the transmission of an output signal.

SUMMARY OF THE INVENTION

The present invention seeks to provide a product for holding a tobacco material or a tobacco substitute material, the product including an electronic device, wherein the electronic device is covered by a protective layer which is arranged so as to substantially prevent egression of compounds from the electronic device into the storage environment whilst being adapted to permit the reception of an external stimulus by the electronic device and the transmission of an output signal.

According to a first aspect of the invention, there is provided a product for holding a tobacco material or a tobacco substitute material comprising a body defining a storage environment for holding a tobacco material or a tobacco substitute material, and an electronic device. The electronic device has an input means to generate an input signal from an external stimulus and an output means to generate an output signal in response to the input signal, with at least the output means is arranged on a substrate. A protective layer is arranged to at least cover the substrate and the output means so as to prevent egression of compounds therefrom to the tobacco material or tobacco substitute material within the storage environment and to allow transmission of the output signal. The input means comprises at least one of a wireless signal receiver and a sensor.

A second aspect of the invention relates to a product for holding a tobacco material or a tobacco substitute material comprising a body defining a storage environment for holding a tobacco material or a tobacco substitute material, and an electronic device. The electronic device has a power source, an input means to generate an input signal from an external stimulus, an output means to generate an output signal, digital processing means to process the input signal and deliver a command signal to the output means based at least in part on processing of the input signal, and circuitry connecting the power source, the input means, the output means and the digital processing means. At least the power source, the input means, the output means, the digital processing means and the circuitry are arranged on a substrate. A protective layer is arranged to at least cover the substrate, the power source, the output means, the digital processing means and the circuitry so as to prevent egression of compounds therefrom to the tobacco material or tobacco substitute material within the storage environment and to allow transmission of the output signal.

According to a third aspect of the invention, there is provided a product for holding a tobacco material or a tobacco substitute material comprising a body defining a storage environment for holding a tobacco material or a tobacco substitute material, and an electronic device. The electronic device has a power source, an input means to generate an input signal from an external stimulus, an output means to generate an output signal, digital processing means to process the input signal and deliver a command signal to the output means based at least in part on processing of the input signal, and circuitry connecting the power source, the input means, the output means and the digital processing means. At least the power source, the input means, the output means, the digital processing means and the circuitry are arranged on a substrate. A protective layer is arranged to at least cover the substrate, the power source, the output means, the digital processing means and the circuitry so as to prevent egression of compounds therefrom to the tobacco material or tobacco substitute material within the storage environment and to allow transmission of the output signal. A barrier layer is arranged to cover the input means so as to prevent egression of compounds therefrom to the tobacco material or tobacco substitute material within the storage environment, the barrier layer adapted to allow interaction of the input means with the external stimulus to generate the input signal.

A fourth aspect of the invention refers to a product for holding a tobacco material or a tobacco substitute material comprising a body defining a storage environment for holding a tobacco material or a tobacco substitute material, and an electronic device. The electronic device has a power source, an input means to generate an input signal from an external stimulus, an output means to generate an output signal, digital processing means to process the input signal and deliver a command signal to the output means based at least in part on processing of the input signal, and circuitry connecting the power source, the input means, the output means and the digital processing means. At least the power source, the input means, the output means, the digital processing means and the circuitry are arranged on a substrate. A protective layer is arranged to at least cover the substrate, the power source, the output means, the digital processing means and the circuitry so as to prevent egression of compounds therefrom to the tobacco material or tobacco substitute material within the storage environment and to allow transmission of the output signal. A barrier layer is arranged to cover the input means so as to prevent egression of compounds therefrom to the tobacco material or tobacco substitute material within the storage environment and to allow interaction of the input means with the external stimulus to generate the input signal, with the barrier layer comprising at least one cut or opening.

BRIEF DESCRIPTION OF THE DRAWINGS

Embodiments of the invention will now be described, by way of example only, with reference to the accompanying drawings, in which.

DETAILED DESCRIPTION OF EMBODIMENT OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
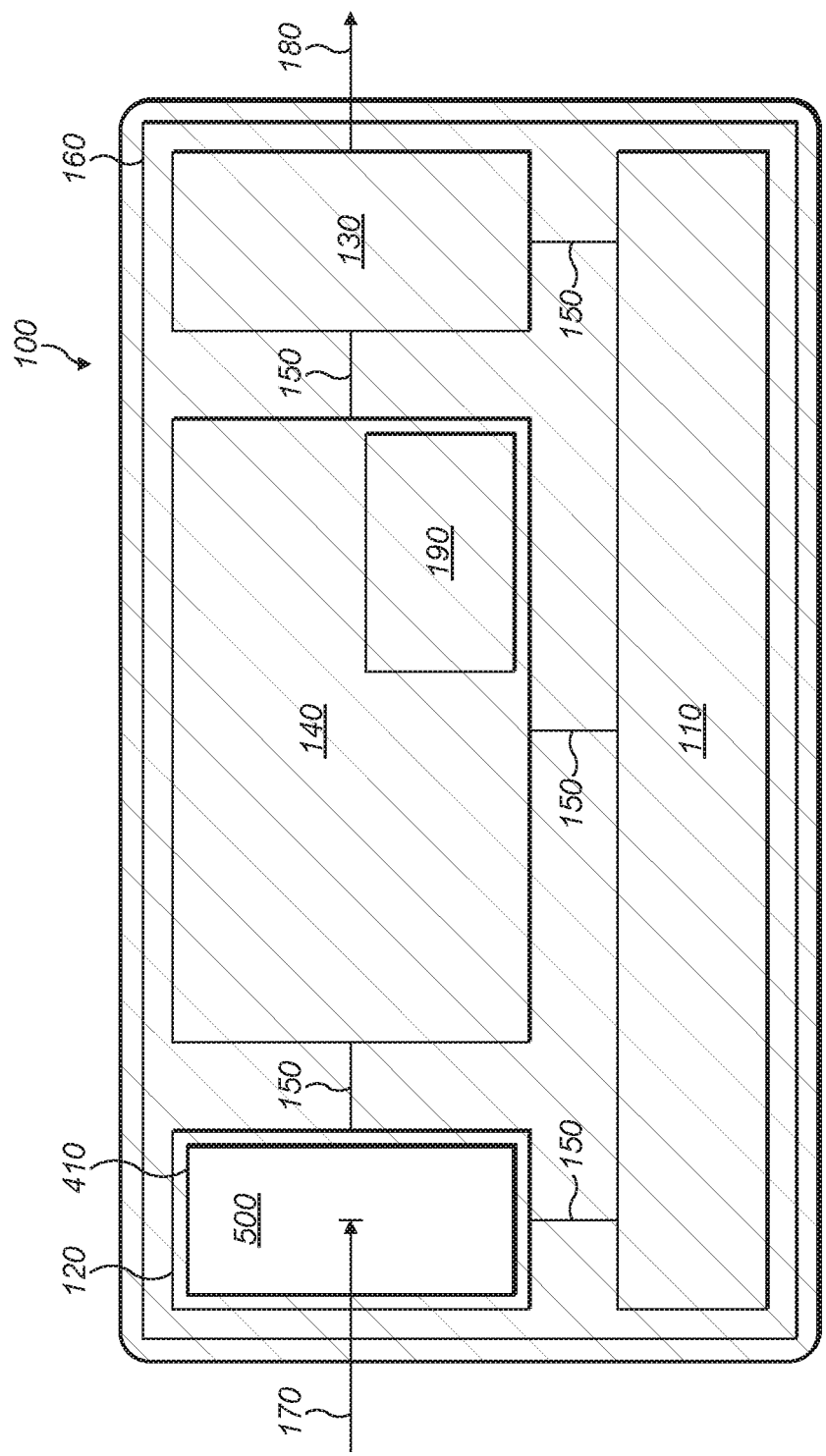
FIG. 1 schematically illustrates an electronic device for use in a product for holding a tobacco material according to an embodiment of the invention.

FIG. 1 schematically illustrates an electronic device 100 for use in a product for holding a tobacco material or tobacco substitute material according to an embodiment of the invention. The integrated electronic device 100 comprises an input means 120 and an output means 130. In this example both the input means 120 and the output means 130 are arranged on a substrate 160 and a protective layer 400 is arranged to completely cover the substrate 160 other than a certain area 410 corresponding to the position of the input means 120. In this example the electronic device 100 further includes digital processing means 140 and circuitry 150 arranged on the substrate and covered by the protective layer. The circuitry 150 is arranged to connect the power source 110, the input means 120, the output means 130 and the digital processing means 140 together. Electrical power, or signals, or both, may be conveyed (or transferred) between the power source 110, the input means 120, the output means 130, the digital processing means 140 via the circuitry 150. The circuitry 150 may be formed by printing silver tracks on the substrate 160 connecting the components. The input means 120 may be arranged on the substrate with the other components or alternatively may be arranged separately and be operatively connected to the remaining components by circuitry.

The power source 110, the input means 120, the output means 130, the digital processing means 140 and the circuitry 150 may be formed by being printed on a substantially flexible substrate 160. That is to say, each of these components of the integrated electronic device 100 may be formed as part of a printing process onto a surface (the substrate 160) which may be substantially flexible. The substrate 160 may be flexible to the extent that it may be deformed to conform to the shape of another object (such as a package into which the integrated electronic device 100 is to be placed or built into as discussed further below). The substrate 160 may be comprised of synthetic material, or natural material, or both in a sheet form, preferably Polyethylene terephthalate or PET. The substrate 160 may comprise a laminate layered on top of another material. The substrate 160 may comprise folding or creasing lines or both to allow the integrated electronic device 100 to be folded to form a three-dimensional object (such as the packaging discussed below).

Alternatively the substrate 160 may be a rigid PCB with electronic components soldered into place or a structure supporting an RFID tag.

The power source 110 provides electrical power for the integrated electronic device 100. The power source 110 may comprise any one of the following: a battery; energy harvesting means; or electromagnetic charging means or any combination thereof. As an example, the integrated electronic device 100 may comprise a battery together with energy harvesting means and/or electromagnetic charging means, whereby the energy harvesting means and/or the electromagnetic charging means may act to charge the battery. In such an arrangement, energy gained via the energy harvesting means and/or the electromagnetic charging means which is surplus to the present requirements of the integrated electronic device 100 may be stored in the battery for later use. Preferably, the integrated electronic device 100 comprises at least a battery, which is preferably formed by a printing process. However, it will be appreciated that this need not be the case.

The input means 120 are arranged to generate an input signal from an external stimulus 170. Preferably, the input means 120 comprises a sensor which is arranged to generate an input signal which is proportional to a sensed environmental parameter. Preferably, such a sensor comprises one or more of the following types of sensors: a humidity sensor; a light sensor; a motion sensor; a temperature sensor; and a gas sensor. It will, however, be appreciated that any other kind of sensor may be used as the input means 120. There are many different ways in which a sensor may operate to produce an input signal (the input signal being the output signal from the sensor) in response to an environmental parameter.

Other forms of input means 120 may be used instead of a sensor. As an alternative, the input means 120 may comprise a wireless signal receiver which is arranged to generate an input signal based on a transmission received from a wireless signal transmitter. For example, a wireless signal transmitter may be arranged to transmit one or more measurements of sensed environmental parameters from one or more sensors that are local to the transmitter and the wireless signal receiver on the integrated electronic device 100 may produce an input signal which corresponds to the one or more measurements in response to receiving the transmitted signal. However, the transmitted signal may be any form of signal and need not necessarily correspond to a sensed environmental parameter.

The input means 120 may comprise both a sensor and a wireless signal receiver. For example, the sensor may be arranged to generate an input signal which is proportional to a first set of sensed environmental parameters and the wireless signal receiver may be arranged to generate an input signal based on one or more measurements of a second set of sensed environmental parameters from one or more sensors in response to receiving a transmitted signal from a wireless signal transmitter local to the one or more sensors.

Alternatively, the sensor may be arranged to generate an input signal which is proportional to a set of sensed environmental parameters and the wireless signal receiver may be arranged to generate an input signal based on one or more measurements of the same set of sensed environmental parameters from one or more sensors in response to receiving a transmitted signal from a wireless signal transmitter local to the one or more sensors. As a result, redundancy of measurements is possible to ensure that critical parameters are measured with a greater reliance. If the sensor is located in a first environment, such as an interior of a container, and the one or more sensors are located in a second, different environment, such as a surrounding environment of a container, parameter gradients may be measured with one electronic device 100, providing greater flexibility to the design of this kind of device.

The output means 130 are arranged to generate an output signal 180. Preferably the output means 130 comprises at least one of a display, a lighting means, a sound generator and/or a wireless signal emitter.

Where the output means 130 comprises a display, the display may be arranged to display one or more characters, numerals or symbols, or any combination thereof, or may be arranged to display a graphical output (which might include graphical representations of characters, numerals or symbols, or any combination thereof). The display may be a printed electrochromic display.

Where the output means 130 comprises lighting means, the lighting means may be arranged to provide an output signal 180 through the brightness of the emitted light. As an example, the lighting means may emit light as a first output signal and no light or periodic flashing light as a second output signal. Alternatively or additionally, the lighting means may be arranged to provide an output signal 180 through a colour of the emitted light. As an example, the colour of emitted light might be set to a first colour (e.g. red) as a first output signal, and might be set to a second colour (e.g. blue) as a second output signal. The lighting means may comprise an LED.

Where the output means 130 comprises a sound generator, the sound generator may be arranged to provide an output signal 180 through changing the volume, pitch or both of the generated sound. The output signal 180 may be the presence (or absence) of sound from the sound generator. As an example, the sound generator may emit a sound as a first output signal and no sound as a second output signal. Alternatively or additionally, more subtle variations in the volume, pitch or both of the sound may be used to provide two or more output signals. As an example, as a first output signal the sound generator may emit a sound at a first pitch and as a second output signal may emit a sound at a second pitch.

Where the output means 130 comprises a wireless signal transmitter, the wireless signal transmitter may be arranged to provide an output signal 180 by emitting a wireless signal. The output signal 180 may be conveyed by the presence (or absence) of a wireless signal from the wireless signal transmitter. As an example, the wireless signal transmitter may transmit a wireless signal as a first output signal and no wireless signal as a second output signal. Alternatively or additionally, the wireless signal transmitter may be arranged to convey data via the wireless signal. As an example, the wireless signal transmitter may be arranged to encode data representing a sensed environmental parameter provided as an input signal by the input means 120 of the integrated electronic device 100 onto a wireless signal.

The digital processing means 140 may be arranged to process the input signal from the input means 120 and deliver (or generate) a command signal to the output means 130 based at least in part on the input signal. The command signal that is provided to the output means 130 causes the output means 130 to generate an output signal (or indication) 180 which is based on the command signal. The command signal that is generated by the digital processing means 140 may be based, at least in part, on the input signal. Where the input signal is representative of a sensed environmental parameter, the digital processing means 140 may generate a command signal which causes the output means 130 to provide an output signal 180 which is representative of the magnitude of the sensed environmental parameter. As an example, where the output means 130 comprises a display, the command signal may cause the display to display a numerical value indicating the magnitude of the sensed environmental parameter. For instance, if the input signal corresponds to a sensed environmental temperature of 37° C., the command signal might cause the display to display "37° C.". The digital processing means 140 may, however, perform additional processing on the input signal, for example, to apply thresholds to the input signal and display a corresponding output signal 180. The digital processing means 140 may determine whether the sensed value (e.g. temperature) lies above or below a certain threshold and may generate a command signal which causes the output means 130 to provide a corresponding output signal 180, such as causing lighting means to emit light if the temperature lies above or below the threshold (or vice-versa). Alternatively, the digital processing means 140 may determine whether the sensed value lies within a particular range and may generate a command signal which causes the output means 130 to provide a corresponding output signal 180. Multiple thresholds or ranges may be evaluated by the digital processing means 140, with the generated command signal causing the output means 130 to provide an output signal 180 indicating which threshold or range the sensed value lies within, such as causing lighting means to emit a different colour of light depending on the particular range or threshold which the sensed value lies within. As an example, if the input signal corresponds to a sensed environmental temperature, the digital processing means 140 may determine whether the sensed temperature falls within a given range of values (e.g. between 20° C. and 30° C.) or, if the value does not fall within the range, whether the value is below a threshold which is the lower end of the range (i.e. less than 20° C.) or above a threshold which is the higher end of the range (i.e. more than 30° C.). If, in this example, the sensed temperature does lie within the given range, the digital processing means 140 might generate a command signal which causes a display to display the text "OK" as an output signal 180, whereas, if the sensed temperature is lower or higher than the respective limits of the given range, the command signal generated by the digital processing means 140 might cause the display to display "TOO COLD" or "TOO HOT" respectively as an output signal 180.

The digital processing means may comprise a memory 190 and may, as part of its processing, store data derived from (or based on) the input signal in the memory 190. The command signal that is generated by the digital processing means 140 may be based, at least in part, on the stored data which is derived from one or more previous input signals. The processing performed by the digital processing means 140 may act to determine whether a particular condition has been triggered at any point during a preceding period of time, such as the preceding hour, week or indeed the lifetime of the integrated electronic device 100. The command signal that is generated by the digital processing means 140 may then cause the output means 130 to provide an appropriate indication of whether the condition has been triggered during that time period. It will be appreciated that the data derived from the input signal that is stored in the memory 190 may take many forms depending on the subsequent processing that is required. As an example, where the input signal corresponds to a sensed environmental temperature, a value corresponding to each sensed environmental temperature may be stored in the memory 190. Alternatively, a flag may be set in the memory 190 to indicate whether the sensed environmental temperature has ever reached a given condition. Similarly, a counter may be kept in the memory 190 to indicate the number of times a given condition has been reached. It will be appreciated that any appropriate data which is derived from the input signal may be stored in the memory 190 to allow future processing by the digital processing means 140 to generate a command signal which is based, at least in part, on the previous input signals. As an example, where the input signal is a sensed environmental temperature, the memory 190 may store data representing the previous sensed temperature values. The digital processing means 140 may then determine, based on the data in the memory 190, whether the sensed temperature has ever exceeded a particular threshold value (e.g. greater than 30° C.) or has been outside of a particular range of values (e.g. between 20° C. and 30° C.). The digital processing means 140 may then generate a command signal which causes the output means 130, such as a red LED, to provide an output signal 180 indicating whether the condition has ever been triggered, such as causing the red LED to emit light if the condition has been triggered and not otherwise.

The memory 190 may also or alternatively store other data which is not directly derived from the input signals. The processing that is performed by the digital processing means 140 may also or alternatively be based on such other stored data. For example, the values of the particular thresholds or ranges discussed above (or indeed any other configuration type values) may be stored in the memory 190. Of course, such thresholds or ranges may be provided to the integrated electronic device 100 by an appropriate external stimulus 170 which causes the input means 120 to generate an input signal representing the thresholds or ranges which may then be stored in the memory 190 by the digital processing means 140. In such a case, the input means 120 may be responsive to more than one type of external stimulus 170, to generate different input signals for both the control (or setup or configuration) values and values relating to a sensed environment parameter and the digital processing means 140 may carry out different processing on each type of input signal.

Figure 5:
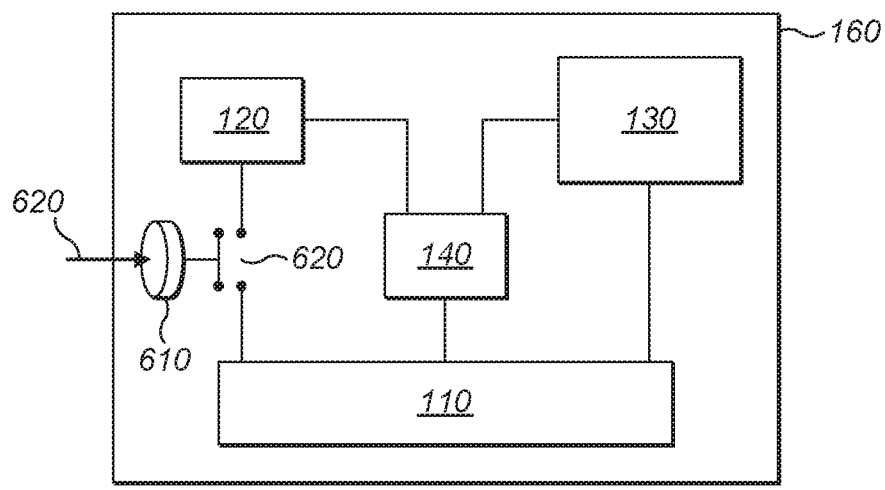
FIG. 5 schematically illustrates an alternative electronic device for use in a product for holding a tobacco material according to an embodiment of the invention.

The integrated electronic device 100 may comprise a switch 600 (shown in FIG. 5) in order to improve the energy efficiency of the device 100. The switch 600 may be used to reduce the amount of processing that is performed by the digital processing means 140 when such processing is not needed. The switch may comprise an on-off switch 600 which functions to toggle between a state in which the integrated electronic device 100 is powered (i.e. in which it is using electrical power from the power source 110) and a state in which the integrated electronic device 100 is not powered (i.e. in which it is not using electrical power from the power source 110). The switch may comprise a push switch 610 which causes the integrated electronic device 100 to produce an output signal 180 when it is pushed. The integrated electronic device 100 need not therefore continually produce the output signal 180, thereby reducing its power requirements. Similarly, if the digital processing means 100 is only required to perform processing in order to cause an output signal 180 to be produced, or can perform less processing if an output signal 180 is not required, then further reductions in power requirements can be achieved by only performing the processing required to cause the output signal 190 to be produced when the push switch 610 is pressed.

A protective layer 400 is used to cover the integrated electronic device 100 to prevent egression of substances or compounds deriving from the electronic device 100 to the storage environment. Many products, such as tobacco material or tobacco substitute material, may be sensitive to alteration of some of their properties via compounds, originating in the materials of the various components of the electronic device 100, reaching the storage environment. Compounds deriving from the electronic device 100 may egress into the storage environment in several different ways. For example, gaseous substances may diffuse from the materials of the electronic device 100 into the product held within the storage environment, liquid substances or compounds may leak into the storage environment and solid particles may detach from the electronic device 100 and migrate to the storage environment. Such compound may ingress, adhere to or otherwise influence a product held within the storage environment.

Examples of specific compounds which may egress to the storage environment, affecting the properties of a product therein, include volatile compounds, in particular volatile organic compounds, and metal oxides.

Figure 7A:
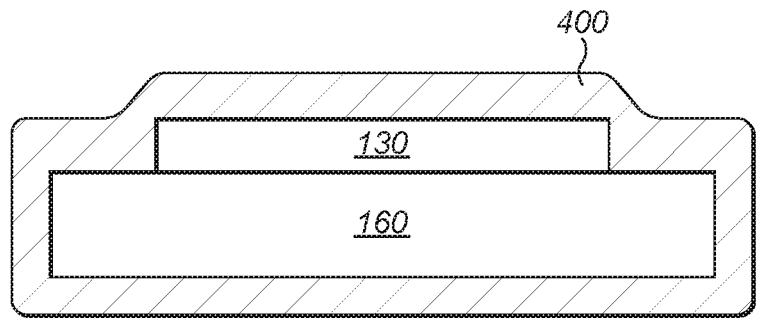
FIG. 7A schematically illustrates a section view of a further alternative electronic device and a film sleeve as the protective layer encapsulating portions of the device.
Figure 7B:
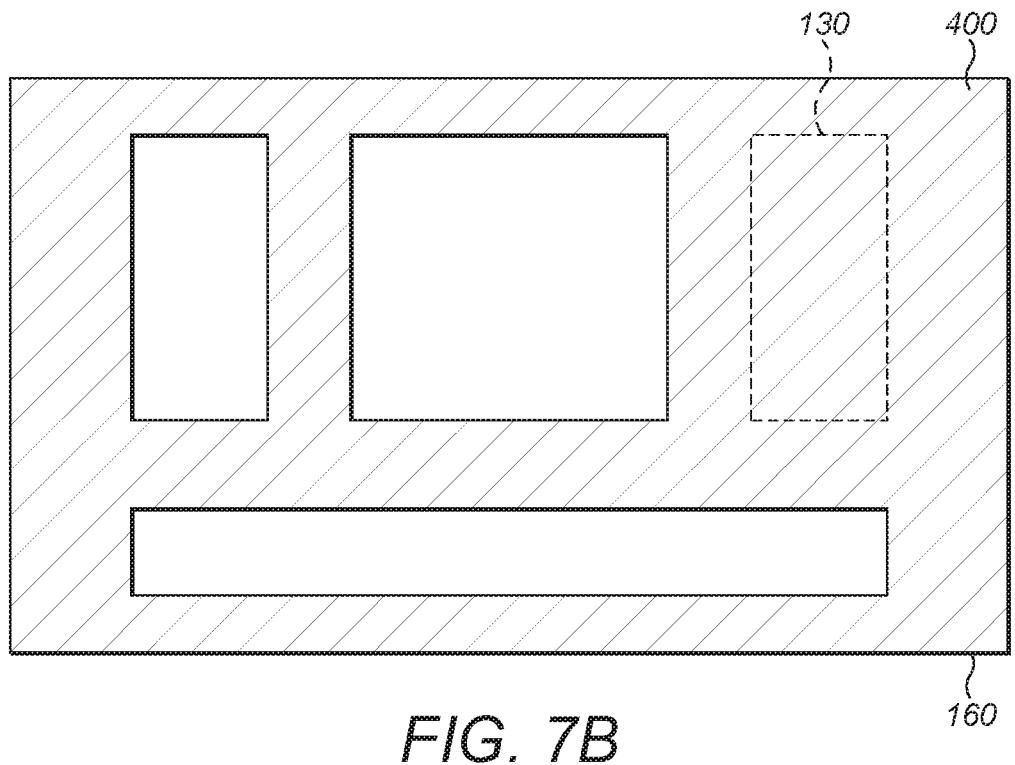
FIG. 7B schematically illustrates a front view of the electronic device of FIG. 7A.

The protective layer 400 may be adapted to substantially prevent the egression of such compounds into the storage environment. Suitable protective layers 400 which provide such a protective function include a laminated film material or a varnish. Preferably, the laminated film material is selected from a natural polymer, a synthetic polymer, a paper product and a metal foil. Since the protective layer 400 may be in contact with a product such as a tobacco material, the material of the protective layer 400 must be suitable to contact the stored product. The protective layer may be a film sleeve arranged to encapsulate the device 100 as shown in FIGS. 7A and 7B.

Figure 6:
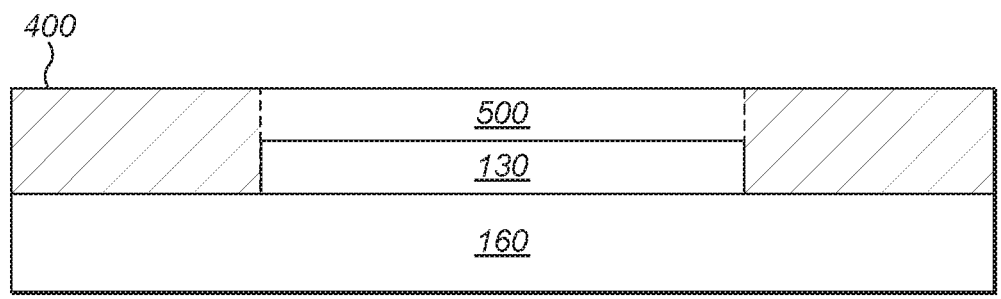
FIG. 6 schematically illustrates a section view of an alternative electronic device for use in a product for holding a tobacco material according to an embodiment of the invention.

In addition to preventing the egression of compounds from the electronic device 100 to the storage environment, the protective layer 400 must be adapted to allow the interaction of the input means 120 with an external stimulus 170. In FIG. 1, there is a window 410 in the protective layer 400 corresponding to the position of the input means 120 on the substrate 160. In an example where the material of the input means 120 is suitable to contact the stored product, this window 410 may simply be an opening in the protective layer 400 such that an external stimulus such as light, humidity, air or heat may pass through to reach the input means 120 such that a corresponding input signal may be generated. Alternatively the window 410 may comprise a barrier layer 500 which may be continuous with the protective layer 410 (as shown in FIG. 6), the barrier layer 500 adapted so as to substantially prevent egression of compounds from the electronic device 100 whilst permitting an external stimulus to reach the underlying input means 120.

An example of such a barrier layer 500 is a selective barrier, positioned on top of the input means 120. The selective barrier may be adapted to permit the passage of air but prevent certain select compounds from passing through. Such a selective barrier may be an air permeable barrier, allowing air to pass from the storage environment to the input means 120 such that humidity, for example, may be sensed but prevent certain compounds passing from the electronic device 100 into the storage environment to affect the product therein. Alternatively the selective barrier may permit the passage of electromagnetic radiation of a certain wavelength range, for example visible light, but prevent the egression through the barrier of certain compounds.

Suitable barrier layers 500 include a laminated film material or a varnish, where, preferably, the laminated film material is selected from a natural polymer, a synthetic polymer, a paper product and a metal foil. Since the barrier layer 500 may be in contact with a product such as a tobacco material, the material of the barrier layer 500 must be suitable to contact the stored product.

Figure 4A:
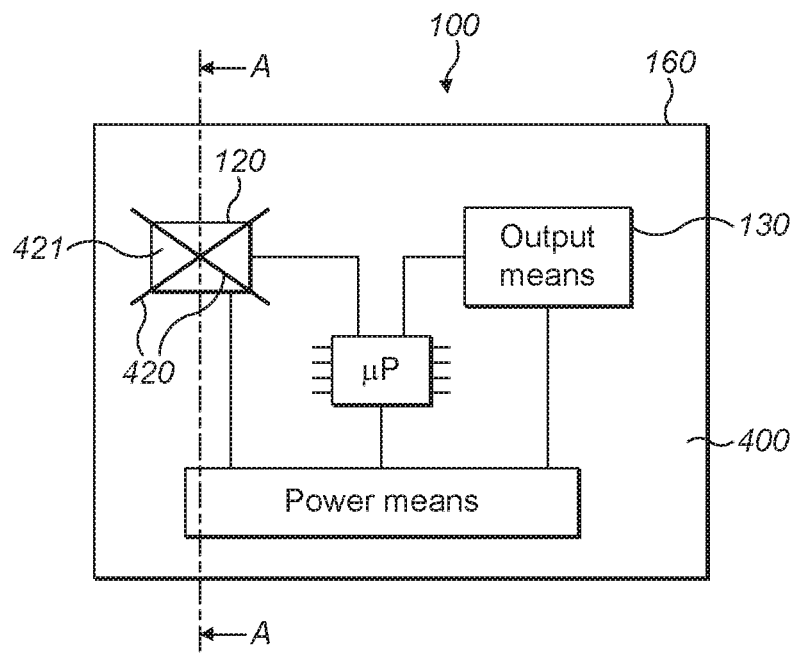
FIG. 4A schematically illustrates alternative electronic device for use in a product for holding a tobacco material according to an embodiment of the invention.

FIG. 4A schematically illustrates a further example of an electronic device 100 for integration in a product for holding a tobacco material or tobacco substitute material according to the present invention. In this example, the protective layer 400 covers the entirety of the substrate 160 including the input means 120. There are additionally one or more elongate narrow cuts or slits 420 within the protective layer 400, positioned in a portion of the protective layer 400 which lies over the input means 120. In the specific example illustrated in FIG. 4A two slits are arranged so as to form a cross arrangement centred over the input means 120, which define four intercalating tabs 421.

Figure 4B:
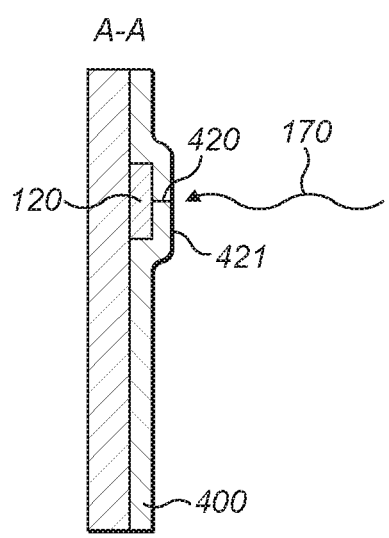
FIG. 4B schematically illustrates a section view of the electronic device of FIG. 4A in a non-operative state.

The slits 420 are configured such that, in an inoperative state, each tab 421 lies flat against the input means 120 and closely against the adjacent tabs 421, such that the protective layer 400 is substantially continuous over the underlying input means 120. FIG. 4B is a schematic cross section of an inoperative state of the exemplary electronic device 100 of FIG. 4A. The figure illustrates how the tabs 421 lie over the input means 120, meeting each other centrally above the input means 120 so as to define a barrier, enclosing the input means 120 under the protective layer 400. The slits 420 and corresponding intercalating tabs 421 are arranged such that they form a closure, sufficiently tightly sealed so as to substantially prevent the egression of certain compounds, derived from the electronic device 100, from reaching the storage environment. In other words, part of the protective layer 400 acts as the barrier layer 500 in some previous embodiments.

Instead of or in addition to the slits 420, the protective layer 400 may comprise narrow openings, such as microperforations, positioned in a portion of the protective layer 400 that overlies the input means 120. The narrow openings are arranged, in an inoperative state, so as to form a closure, sufficiently tightly sealed so as to substantially prevent the egression of certain compounds, derived from the electronic device 100, from reaching the storage environment. In other words, in an inoperative state, the narrow openings are configured such that the protective layer 400 is substantially continuous over the underlying input means 120.

Figure 4C:
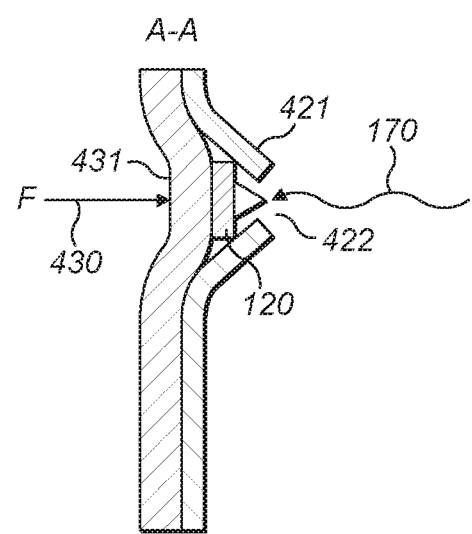
FIG. 4C schematically illustrates a section view of the electronic device of FIG. 4A in an operative state.

Since in an inoperative state the input means 120 of the electronic device 100 of FIG. 4 is substantially covered by the protective layer 400, the passage of an external stimulus 170 may be significantly blocked such that it is not effectively received by the input means 120. The electronic device 100 may therefore further comprise activation means 430 to switch the electronic device 100 into an operative state in which the external stimulus 170 may be received by the input means 120, as illustrated in FIG. 4C. In the operative state, the slits 420 are selectively broadened so as to expose the input means 120 to the external stimulus 170. In the example of FIG. 4C the broadening of the slits 421 is provided by an outward inclination of the intercalating tabs 421 such that they separate, defining an opening 422 through which the external stimulus 170 may pass to be received by the input means 120.

Similarly, the narrow openings may be selectively broadened through the activation means 430 so as to expose the input means 120 to the external stimulus 170. The narrow openings may be frustoconically shaped, with the smaller diameter positioned so as to face towards the input means 120 and the larger diameter positioned so as to face outwards the input means 120. This particular configuration is advantageous as it requires little broadening to achieve the desired exposure of the input means 120.

The activation means 430 may be provided in a number of different ways. In the example of FIG. 4C, the activation means is provided by a substantially flexible region 431 of the substrate 160. In this case, a force 432 may be applied from the underside of the flexible region of the substrate 160 in a direction so as to deform a deformable or flexible region 431 of the substrate 160, causing the intercalating tabs 421 to incline and open and exposing the input means 120 to the external stimulus 170. The activation means 430 may alternatively be provided by a piezoelectric element, configured to move under the application of an electric field so as to open the intercalating tabs 421 as required. It will further be appreciated that the activation means may be any electric, physical, mechanical or other process under the action of which the input means 120 may be exposed from within the protective layer 400 to receive the external stimulus 170. The activation means 430 may be actuated by a user actuatable switch such that the input means 120 may be selectively exposed to the external stimulus 170 for a predefined time period. The protective layer 120 and deformable region 431 of the substrate may be made of an elastic or viscoelastic material which relaxes back to its equilibrium position slowly such that the input means 120 is exposed to the external stimulus for a predefined time period of sufficient duration for the external stimulus to be received. This may also ensure a user does not have to continuously hold an actuation switch while the input means 120 is receiving the external stimulus but rather may simply actuate the switch once, following which the tabs 421 will close after a certain period of time.

It will be noted that the narrow cuts or openings may be sized to substantially prevent the egression of certain compounds, derived from the electronic device 100, from reaching the storage environment whilst allowing interaction of the input means 120 with the external stimulus 170.

Further to preventing the egression of compounds from the electronic device 100 to the storage environment and allowing the interaction of the input means 120 with an external stimulus 170, the protective layer 400 must be adapted to allow the transmission of the output signal 180 generated by the output means 130. To that end, at least a portion of the protective layer 400 overlying the output means 130 may permit the passage of electromagnetic radiation of a certain wavelength range, for example visible light, or may be adapted to transmit acoustic signals, such as those generated by a sound generator.

The integrated electronic device 100 as described above has many benefits stemming from the fact that the components may be printed and that the substrate 160 may be substantially flexible. These properties make the integrated electronic device 100 suited for the field of product packaging, particularly that of product packaging for tobacco products. Many products, including tobacco products, have storage requirements that must be met in order for the product to remain in optimum condition or to ensure an optimum lifespan. Deviation from these storage requirements may result in degradation of the product. However, the logistics involved in the delivery of goods from point of manufacture or packaging to the end consumer is typically very complex meaning that it is hard to ensure or monitor whether the storage requirements for a particular product have been maintained throughout the supply chain. Furthermore, even after the product has been supplied to the end user, it may be desirable to continue monitoring the storage conditions of the product to allow the end user to periodically check whether the product is still in an optimal condition or whether it is likely to have degraded or expired due to the environment in which it has been stored. Additionally, even where the storage environment of a packaged product can be monitored, it is typically only practical to do so on a macro scale. In other words, only the overall environment of the storage room or warehouse that the packaged products are stored in is monitored. Due to variations within the storage room or warehouse, which may for example have localised hot or humid areas which are more hot or humid than elsewhere in the storage area, the actual environmental conditions that are experienced by each individual packaged product may differ. The properties of the integrated electronic device 100 as described above allow the integrated electronic device 100 to be integrated into, or supplied with, the product packaging of each product, allowing the storage environment for each product to be monitored and reported on at all points through the supply chain and through the product's subsequent storage by the end user. In particular, the use of the invention is contemplated in respect of a container for storing tobacco. One of the common forms in which tobacco products are supplied to end users is in a loose form which allows the end user to create their own smoking article (e.g. "roll your own cigarettes"). This loose form tobacco is typically supplied in large containers which contain enough tobacco to allow for a relatively long period of use. Moisture in the atmosphere to which the tobacco is exposed is likely to cause the tobacco product to degrade. It is therefore desirable to allow the user to monitor the storage conditions of the tobacco product to allow them to rectify any incorrect storage of the tobacco product and/or assess whether the quality of the tobacco is likely to still be at an acceptable (or optimal) level. Whilst the following description is focused on the use of an exemplary integrated electronic device 100 to be used with a tobacco container for storing loose tobacco to monitor the exposure of the tobacco to atmospheric moisture, it will be appreciated that such an integrated electronic device 100 may be used with any kind of container for any kind of product to monitor exposure of the product to atmospheric moisture. Similarly, it will be appreciated that the integrated electronic device 100 may be adapted to monitor exposure of product to other kinds of conditions such as temperature or sunlight.

Figure 2:
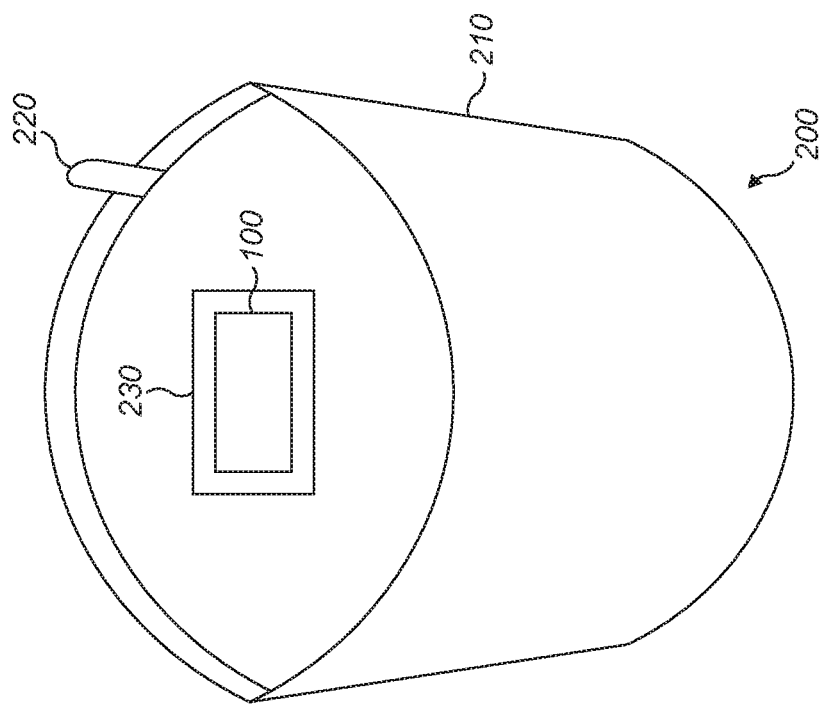
FIG. 2 schematically illustrates exemplary product for holding a tobacco material according to an embodiment of the invention.

FIG. 2 schematically illustrates packaging (or container) 200 for storing tobacco. The packaging 200 comprises a body 210, a seal 220, a tag (or label or insert) 230 and optionally a lid (not shown).

The seal 220 is sealed to the body 210 as part of the manufacturing or packaging process in order to isolate the product inside the package 200, thereby preventing access to the product and helping provide protection against the environment until the seal 220 is removed. In order to access the product for the first time, the user must unseal (or break) the seal 220. It will be appreciated that whilst most packages will make use of a seal 220, it is not strictly necessary for the package 200 to have a seal 220. As an example, a package 200 might simply comprise a lid to protect or retain the product inside the packaging. Preferably the seal 220 is made from aluminium foil.

The tag 230 comprises an integrated electronic device 100 for monitoring exposure to moisture or humidity in the immediate vicinity of the tag 230. Preferably the tag 230 is made of plastic such as PET which may also form the substrate 160 upon which the integrated electronic device 100 is formed. Preferably, the tag 230 is approximately the size of a typical credit card, that is to say approximately 8.9 cm by 3.8 cm (or 3.5 inches by 1.5 inches), so as to allow easy manufacture, packaging and handling of the tag 230. However, the tag 230 may be any size provided it is large enough to accommodate the integrated electronic device 100. In use, the tag 230 is placed within the tobacco stored in the body 210 of the package 200 enabling the integrated electronic device 100 to measure the direct environment of the stored tobacco. The tag 230 may be provided with the package 200 already placed in the stored tobacco. In other words, the tag 230 may be placed in the tobacco during the manufacturing or packaging process, before the seal 220 is sealed to the container body 210. Alternatively, as illustrated, the tag 230 may be placed on top of the seal 220 underneath the lid, in which case the user may be required to place the tag 230 in the stored tobacco once the seal 220 is unsealed.

The power source 110 of the integrated electronic device 100 preferably comprises a battery capable of storing sufficient electrical energy to power the integrated electronic device 100 for approximately 1 year.

The input means 120 of the integrated electronic device 100 comprises a humidity sensor. The humidity sensor produces an input signal indicative of the relative humidity of the environment based on the external stimulus 170 of the moisture in the immediate environment of the humidity sensor. Preferably the humidity sensor has a range of approximately 12% relative humidity with a sensitivity of 1% relative humidity in either direction at room temperature.

The output means 130 of the integrated electronic device 100 preferably comprises a display through which a visual output signal 180 can be provided.

The digital processing means 140 of the integrated electronic device 100 are arranged to process the input signal from the humidity sensor and deliver a command signal to the display to cause the display to generate an output signal 180, as discussed earlier. The digital processing means 140 is arranged to generate a command signal which causes the display to provide a numeric indication of the value of the sensed relative humidity as a percentage. As described above, the digital processing means 140 of the integrated electronic device 100 may comprise a memory 190, in which the digital processing means 140 may store data based on previous input signals to allow the digital processing means 140 to determine whether the sensed relative humidity has ever exceeded a particular threshold. If the digital processing means 140 determine that the threshold level of relative humidity has previously been exceeded, then the digital process means 140 may generate a command signal which causes the display to indicate this condition to the users, for example by displaying the text "TOO HUMID".

The integrated electronic device 100 may comprise an on-off switch 600 as discussed above. The integrated electronic device 100 may therefore be configured to be in a powered off state during manufacture or packaging, such that electrical power from the power source 110 is preserved. The integrated electronic device 100 may therefore require activating by toggling the on-off switch 600 so that the integrated electronic device 100 is powered before the package environment can be monitored by the integrated electronic device 100. The activation of the integrated electronic device 100 may take place during the manufacturing or packaging process, for example, the tag 230 may be placed in stored tobacco and the integrated electronic device 100 activated prior to the seal 220 being sealed. In this case, the environmental conditions throughout the supply chain may be monitored and reported on. Alternatively, the activation of the tag 230 may be performed by the end user upon opening the product. As an example, the tag 230 may be placed on top of the seal 220 during packaging with the integrated electronic device 100 in an unpowered (or off) state. Upon opening the package 200 and unsealing the seal 220, the user may place the tag 230 in the tobacco and toggle the switch to cause the integrated electronic device 100 to be powered so that the package's storage environment during the user's custody of the package 200 may be monitored and reported on. This allows the lifespan of the integrated electronic device 100 during the user's custody of the package 200 to be maximised. The output means 130 of the integrated electronic device 100 may be further configured to provide an additional output signal 180 to indicate whether the device has been activated or not. As an example, the output means 130 might comprise lighting means (or additional lighting means) which is configured to emit light if the device has been activated and not otherwise.

Figure 3:
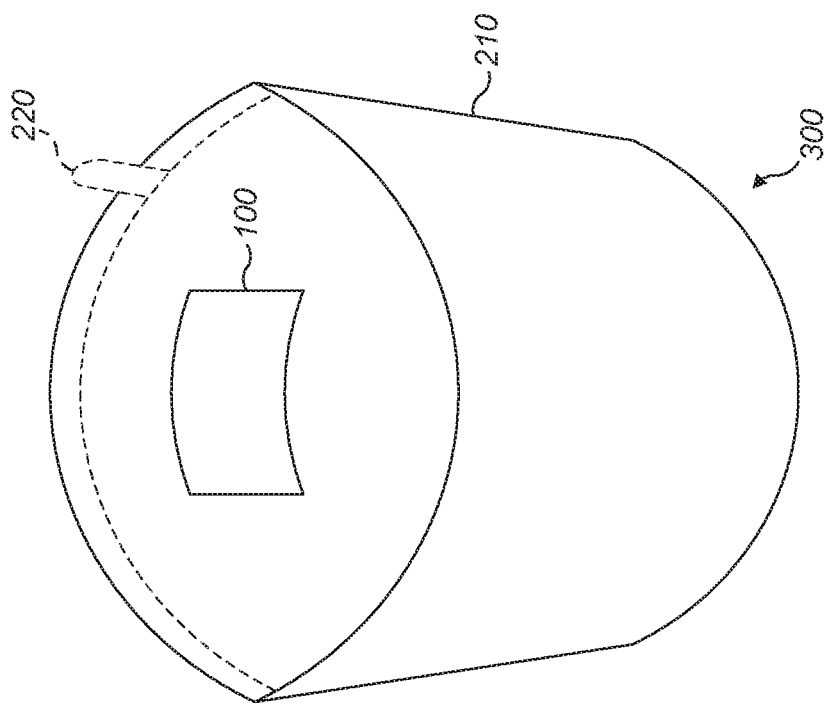
FIG. 3 schematically illustrates alternative product for holding a tobacco material according to an embodiment of the invention.

FIG. 3 schematically illustrates an alternative exemplary packaging (or container) 300 for storing tobacco. The exemplary packaging 300 illustrated in FIG. 3 is similar to that illustrated in FIG. 2. In a similar manner to the exemplary package 200 illustrated in FIG. 2, the exemplary packaging 300 illustrated in FIG. 3 comprises a body 210, a seal 220 and optionally a lid (not shown). However, instead of a separate tag 230 upon which an integrated electronic device 100 has been formed, the integrated electronic device 100 of the exemplary packaging 300 illustrated in FIG. 3 has been formed as part of the wall of the body 210 of the packaging 300. The integrated electronic device 100 may be formed by printing its components directly on the material used to form the wall of the body 210 of the package 300 provided of course that the material from which the body wall is formed is appropriate for use as a substrate 160, such as plastic (e.g. PET). Where the material from which the body wall is formed is not appropriate for use as substrate 160, a portion (or region) of the body wall upon which the integrated electronic device 100 is to be formed may be laminated with a material which is appropriate for use as substrate 160. Alternatively, the integrated electronic device 100 may be formed on a separate piece of material in a similar manner to that used to produce the tag 230 of the exemplary package 200 illustrated in FIG. 2, which may then subsequently be adhered to the wall of the body 210 of the package 300 using a suitable adhesive. The integrated electronic device 100 is arranged as for the exemplary package 200 illustrated in FIG. 2, as discussed above. It will be noted that instead of forming the integrated electronic device 100 integrally with the wall of the body 210 of the package 300, the integrated electronic device 100 could be integrally formed with the lid of the package 300 or as part of the seal 220.

Through the provision of the integrated electronic device 100 as part of a product package for storing tobacco, users can assess the freshness and quality of the tobacco, as well as being able to determine whether the package has been stored in conditions which are outside of preconfigured humidity conditions. Furthermore the provision of an appropriately adapted protective layer prevents the egression of compounds from the electronic device 100 to the storage environment of the product for holding a tobacco material, whilst permitting the reception of an external stimulus 170 by the input means 120 and the transmission of an output signal 180 by the output means 130.

The invention claimed is:

1. A product for holding a tobacco material or a tobacco substitute material comprising:

a body defining a storage environment for holding a tobacco material or a tobacco substitute material; and
an electronic device including:
   a substrate;
   an input means to generate an input signal from an external stimulus;
   an output means to generate an output signal in response to the input signal;
   wherein at least the output means is arranged on the substrate;
wherein a protective layer is arranged to at least cover the substrate and the output means so as to prevent egression of compounds therefrom to the tobacco material or the tobacco substitute material within the storage environment and to allow transmission of the output signal, and
wherein the input means comprises at least one of a wireless signal receiver and a sensor.

2. The product according to claim 1, further comprising a barrier layer arranged to cover the input means so as to prevent egression of compounds therefrom to the tobacco material or the tobacco substitute material within the storage environment, the barrier layer adapted to allow interaction of the input means with the external stimulus to generate the input signal.

3. The product according to claim 2, wherein the barrier layer comprises at least one cut or opening.

4. The product according to claim 3, wherein the barrier layer comprises a deformable region, the product further comprising an activation means adapted to cause deformation of the deformable region so as to selectively broaden the at least one cut or opening such that the input means are directly exposed to the external stimulus for a predefined time period, the at least one cut or opening otherwise remaining closed so as to prevent direct exposure of the input means to the storage environment.

5. The product according to claim 4, wherein the activation means is at least one of a piezoelectric element and a substantially flexible region of the substrate.

6. The product according to claim 4, wherein the activation means include a user-actuatable switch.

7. The product according to claim 2, wherein the barrier layer is a selective barrier.

8. The product according to claim 7, wherein the selective barrier is configured to allow air through.

9. The product according to claim 7, wherein the selective barrier is configured to prevent the passage of select compounds through the selective barrier into the storage environment.

10. The product according to claim 7, wherein the selective barrier is configured to allow the passage of electromagnetic radiation of a predetermined frequency range.

11. The product according to claim 2, wherein the barrier layer is a part of, integrally formed with or attached to the protective layer.

12. The product according to claim 2, wherein at least one of the protective layer and the barrier layer is made of printable material.

13. The product according to claim 1, wherein the input means are arranged on the substrate.

14. The product according to claim 1, wherein the substrate is substantially flexible.

15. The product according to claim 1, wherein the electronic device is an integrated electronic device.

16. The product according to claim 1, wherein at least one of the input means and the output means is printed on the substrate.

17. The product according to claim 2, wherein at least one of the protective layer and the barrier layer is laminated.

18. The product according to claim 2, wherein at least one of the protective layer and the barrier layer is a varnish.

19. The product according to claim 1, wherein the protective layer is a film sleeve material arranged to encapsulate at least the substrate and the output means.

20. The product according to claim 1, wherein the electronic device further comprises:
   a power source;
   digital processing means to process the input signal and deliver a command signal to the output means based at least in part on processing of the input signal; and
   circuitry connecting the power source, the input means, the output means and the digital processing means;
   wherein at least the power source, the output means, the digital processing means and the circuitry are arranged on the substrate; and
   wherein the protective layer is arranged to at least cover the substrate, the power source, the output means, the digital processing means and the circuitry so as to prevent egression of compounds therefrom to the tobacco material or the tobacco substitute material within the storage environment and to allow transmission of the output signal.

21. The product according to claim 20, wherein at least one of the power source, the input means, the output means and the digital processing means is printed on the substrate.

22. The product according to claim 20, wherein the protective layer is a film sleeve material arranged to encapsulate at least the substrate, the power source, the output means, the digital processing means and the circuitry.

23. A product for holding a tobacco material or a tobacco substitute material comprising:
   a body defining a storage environment for holding a tobacco material or a tobacco substitute material; and
   an electronic device including:
      a substrate;
      a power source;
      an input means to generate an input signal from an external stimulus;
      an output means to generate an output signal;
      digital processing means to process the input signal and deliver a command signal to the output means based at least in part on processing of the input signal; and
      circuitry connecting the power source, the input means, the output means and the digital processing means;
      wherein at least the power source, the input means, the output means, the digital processing means and the circuitry are arranged on the substrate;
   wherein a protective layer is arranged to at least cover the substrate, the power source, the output means, the digital processing means and the circuitry so as to prevent egression of compounds therefrom to the tobacco material or the tobacco substitute material within the storage environment and to allow transmission of the output signal.

24. A product for holding a tobacco material or a tobacco substitute material comprising:
   a body defining a storage environment for holding a tobacco material or a tobacco substitute material; and
   an electronic device including:
      a substrate;
      a power source;
      an input means to generate an input signal from an external stimulus;
      an output means to generate an output signal;

digital processing means to process the input signal and deliver a command signal to the output means based at least in part on processing of the input signal; and circuitry connecting the power source, the input means, the output means and the digital processing means;

wherein at least the power source, the input means, the output means, the digital processing means and the circuitry are arranged on the substrate; and wherein a protective layer is arranged to at least cover the substrate, the power source, the output means, the digital processing means and the circuitry so as to prevent egression of compounds therefrom to the tobacco material or the tobacco substitute material within the storage environment and to allow transmission of the output signal; and wherein a barrier layer is arranged to cover the input means so as to prevent egression of compounds therefrom to the tobacco material or the tobacco substitute material within the storage environment, the barrier layer adapted to allow interaction of the input means with the external stimulus to generate the input signal.

25. The product according to claim 24, wherein the barrier layer comprises at least one cut or opening.

* * * * *